United States Patent Office 3,015,626
Patented Jan. 2, 1962

3,015,626
INSULATING COMPOSITION
John C. Kingsbury, 1405 Mayfield Ave., Joliet, Ill.
No Drawing. Filed Sept. 29, 1959, Ser. No. 843,046
5 Claims. (Cl. 252—62)

This invention relates to thermal and acoustical insulating materials. More particularly the invention relates to such materials which include as essential ingredients thereof certain inert minerals, fibers and binders.

Various inert minerals have been used along with fibrous materials and binders for some years in insulating products. For example diatomaceous earth and exfoliated vermiculite have quite often been used as the inert mineral in such materials, as has expanded perlite in more recent years. Perlite is of course a generic term for certain volcanic glasses available in ground ore form and which upon heating to controlled temperatures suddenly expand to form light weight particles having excellent thermal and sound insulating properties. Vermiculite is a micaceous material which also expands or exfoliates upon being heated to form a light weight insulating material.

It has been known for some years that expanded perlite possesses special efficacy when used in conjunction with fibers and certain binders for making light weight insulating boards or the like. Certain of such products, which have been found to be extremely useful for so-called low and medium temperature applications, have included a large proportion of expanded perlite, as low a proportion of fibers as is commensurate with the strength contributing characteristics of this ingredient, and enough binder to hold the mineral and fibers firmly together in a dimensionally stable slab or board composition.

Such products are formed using the so-called "wet process," i.e. by preparing a water slurry of the board ingredients, uniformly suspending the solids throughout the slurry by agitation, de-watering the slurry over a drainage screen or the like to produce a felted wet board, lightly compressing the wet board to give it uniform thickness and to consolidate it, and then drying the board. Expanded perlite recommends itself highly for use in boards of this type for various reasons, cf. board forming slurries containing expanded perlite de-water quickly and are thus advantageously free filtering in nature, and the perlite is light in weight and has good thermal and sound insulating efficiency. The aforedescribed products containing a high proportion of expanded perlite have been particularly useful for certain limited applications, e.g. for roof deck insulation.

Unfortunately such products have been less than completely satisfactory for the various applications in which they have been used, as well as for other and different applications, because of the need for improvement in their thermal efficiency. Such other applications include use as so-called high temperature insulating materials, i.e. having satisfactory insulating qualities at temperatures up to 1000° F. and higher. While it is not generally known what property or properties of the expanded perlite make that material less than entirely satisfactory as an insulator in such applications, it is believed that the generally transparent nature of the expanded perlite particles and their shape lowers their resistance to heat transmission, and specifically permits radiant heat to more readily pass through them, thus decreasing the insulating value of the board.

It is a primary object of the present invention to improve upon these prior compositions by providing insulating materials having all of their advantages and, additionally, possessing materially better thermal efficiency.

An ancillary object of this invention is to provide a general purpose insulating board which is extremely useful throughout the full range of temperatures encountered in various industrial applications calling for the use of insulating boards. More specifically, it is an object to produce an insulating board which is easily formed in the "wet process" and which will also successfully insulate against temperatures ranging all the way from room temperature and below to as high as 1000° F. and higher.

I have discovered that the insulating value of said known products which include as the essential ingredients thereof expanded perlite, fibers, and a binder, may be materially enhanced by adding thereto a substantial portion of specially prepared vermiculite particles. These particles are prepared by first heating vermiculite ore particles at approximately 1400° F. to exfoliate them into accordion-shaped pieces each comprising a plurality of laminated vermiculite platelets of thin, flat shape, and then violently agitating the exfoliated particles to delaminate them and thereby separate the platelets one from another. By so delaminating the exfoliated vermiculite and employing the resulting flat vermiculite laminae or platelets in the board composition as an essential ingredient thereof, the thermal insulating efficiency of the board is found to be materially improved. This is true in spite of the fact that the vermiculite platelets themselves possess a relatively poor thermal efficiency.

In practicing the invention expanded perlite particles having a bulk density of about 2 to 15 p.c.f. are useful. Mesh sizes less than 20 mesh are preferably used although for many purposes larger sized material is also satisfactory. Fibrous substances useful herein may include any of various organic fibers, e.g. newsprint pulp, kraft paper pulp, bagasse and others, as well as inorganic fibers such as asbestos and glass fibers. Long or short fibers may be used equally well, or mixtures of fibers may be employed successfully.

Any commercially available vermiculite ore may be exfoliated and delaminated for use in the compositions of the present invention. While I have used the African variety of vermiculite the forms found in the U.S. and elsewhere will also perform satisfactorily.

Examples of binding materials that may be used in practicing the invention are sodium silicate, glue, bentonite clay, starch, various resins and cements, and asphalt added either as a solid or in the form of an emulsion. Other materials having like properties may also be employed.

Several embodiments of the invention have been described in some detail below in order to enable those skilled in this field to apprehend fully the principles and to produce such units using only the ordinary skills of their specialty. No inference should be drawn, however, from the detailed character of the description that the invention is limited in its employment to any such details of composition or procedure. On the contrary, a wide variety of embodiments is possible, as will readily occur to those skilled in this field and the intention is to cover all alternatives, substitutions and equivalents falling within the spirit and scope of the invention as expressed in the appended claims.

The following examples are given to illustrate the product but as noted should not be construed as limiting the invention to the exact materials and conditions shown therein.

*Example I*

A board was made in the following manner. First African vermiculite ore particles were heated at about 1400° F. until the particles were exfoliated. The bulk density of the exfoliated vermiculite was about 5.7 pounds per cubic foot (p.c.f.) and the sizing of the particles was as follows:

| | |
|---|---|
| +4 mesh | 27.3 |
| +8 mesh | 47.2 |
| +16 mesh | 18.5 |
| +30 mesh | 3.4 |
| +50 mesh | 2.5 |
| +100 mesh | 1.1 |
| −100 mesh | Trace |

The resulting exfoliated vermiculite particles were added to water to make a slurry of about 10% solids content. The slurry was next violently agitated using a high speed propeller type mixer until the vermiculite platelets had been delaminated one from the other.

The slurry was then diluted with water and pulped kraft paper added in such proportion as to constitute 10% kraft paper and 15% vermiculite by weight in the final dry board composition. Finally an appropriate amount of expanded perlite and sufficient sodium silicate solution of 41–42° Bé strength were added to constitute 65% perlite and 10% sodium silicate ($1Na_2O:3.36SiO_2$) in the final dry board composition. The bulk density of the expanded perlite particles was about 3.5 p.c.f. and their sizing was as follows:

| | |
|---|---|
| +8 mesh | Trace |
| +16 mesh | 16.2 |
| +30 mesh | 36.6 |
| +50 mesh | 27.2 |
| +100 mesh | 12.2 |
| −100 mesh | 7.8 |

The various ingredients were thoroughly mixed to make up a slurry having approximately 7% total solids. This slurry was kept suspended by agitation and fed uniformly to a suction mold approximately 18 inches square and 5 inches deep, and including a horizontal screen or sieve. Upon de-watering of the slurry in the suction mold a felted wet board had been formed on the mold screen. The wet board was removed from the mold, hydraulically pressed to one inch thickness and dried in a hot air oven.

The resulting board had a K-factor (coefficient of thermal conductivity in B.t.u. per hr. per sq. ft. per ° F. per inch thickness determined at a mean temperature of 75° F.) of 0.34, a density of 10.35 pounds per cubic foot, and a flexural strength of 40 pounds per square inch. In addition the board had excellent fire resistant qualities. A standard five minute fire resistance test was made in which a portion of the board was suspended horizontally above a Bunsen burner such that the lower surface of the board was eight inches above the top of the burner. Prior to insertion of the burner beneath the board, the burner flame was adjusted at eleven inches height from the burner top to the top of the flame with the flame regulated to give a bluish cone having a definite outline at a height of eight inches above the burner. After the five minute period of application of the flame to the bottom surface of the board the diameter of the light spot resulting from whatever combustion had taken place was measured. In general, the smaller the measured diameter of the central light spot on the board, the better the fire resistance. In this test the board made up as described above produced a light spot that measured only 3.9 cm. in diameter.

*Example II*

A mixture similar to that of Example I was made except that the proportions and ingredients of the final dry board were as follows: 30% expanded perlite, 50% delaminated exfoliated vermiculite, 10% newsprint fibers, and 10% pearl starch binder. The size and weight of the expanded perlite particles were the same as in Example I. The bulk density of the exfoliated African vermiculite particles prior to delamination was about 5.3 p.c.f. and their sizing was as follows:

| | |
|---|---|
| +8 mesh | 28.4 |
| +16 mesh | 56.5 |
| +30 mesh | 6.6 |
| +50 mesh | 4.5 |
| +100 mesh | 2.4 |
| −100 mesh | 1.6 |

The mixture was suspended by agitation as before and poured into the same suction mold as that used in Example I. The wet board was again removed, dried and subjected to various physical tests.

It was found that the board had a K-factor of 0.31, a density of 11.2 p.c.f., a flexural strength of 121.1 p.s.i., and the diameter of the light spot after the fire resistance test was 6.3 cm.

*Example III*

A mixture similar to that of example I was made except that the proportions and ingredients of the final dry board were the following: 30% expanded perlite, 30% delaminated exfoliated vermiculite, 25% newsprint fibers and 15% asphalt. A water slurry of the ingredients was made up generally as before. The asphalt was added to the slurry in the form of an oil-water emulsion containing approximately 50% solids and a small amount of alum was added later to break the emulsion and deposit the asphalt on the suspended solid particles. Once again the mixture was suspended by agitation and formed in a suction mold. The wet board was consolidated by pressing and dried.

The final board had a K-factor of 0.35, a density of 13.9 p.c.f., a flexural strength of 108.5 p.s.i., and the diameter of the light spot after the fire resistance test was 6.1 cm.

*Example IV*

Once more a mixture similar to that of Example I was made except that the proportions and ingredients of the final dry board were the following: 60% expanded perlite, 15% delaminated exfoliated vermiculite, 15% newsprint fibers and 10% asphalt. A water slurry of the ingredients was made up as before, with the asphalt added to the slurry as an emulsion and deposited on the solid particles as detailed in Example III. The mixture was processed as before to form a board. The final dry board was found to possess a K-factor of 0.28, a density of 12.8 p.c.f., a flexural strength of 59 p.s.i., and the diameter of the light spot after the fire resistance test was 5.2 cm.

Some measure of the unexpected results attained through the present invention is evident from a comparison of the properties of the boards described in the examples given above with prior boards made according to the formula given earlier, i.e. including a large proportion of expanded perlite, a small proportion of fibers, and enough binder to hold the two firmly together. Such a prior composition was made using the same forming process as that employed in making the boards described in the above examples. The ingredients of the final dry board and their proportions were as follows: 70% expanded perlite, 20% newsprint fibers and 10% asphalt (added to the slurry as an emulsion as in Examples III and IV above). This board contained no vermiculite particles. The board when dry was found to have a K-factor of 0.40, a density of 11.0 p.c.f., a flexural strength of 55 p.s.i., and the diameter of the light spot after the fire resistance test was 7.90 cm.

In spite of the fact that this latter composition is a suitable insulating material, the striking improvements coming as a result of the present invention will be immediately apparent.

The K-factor of the board made according to the prior formula has been materially improved through practice of the present invention, viz. 0.40 for the prior board compared with only 0.28 to 0.35 for the illustrative new boards. This property, K-factor, is of course a measure of the thermal efficiency of the respective boards. Its importance as a determinant of the quality of insulating materials is well-known. The insulating board industry recognizes boards having a K-factor below about 0.36 as being of special efficacy for the various end uses in which such boards find their main utility. Improvements in the area of a K-factor of 0.36 of as little as .01 or .02 unit are often considered to be of substantial value as far as the utility of the product is concerned. Here, the substantial reduction of the prior K-factor points up the material improvement in thermal efficiency which is accomplished through use of the present invention.

The fire resistance of the new board compositions is also materially improved. For example, comparison of the boards described in Examples III and IV with the prior board which contains no vermiculite reveals a striking improvement in fire resistance, i.e. the light spot on the prior board is much larger than those on the boards described herein. This means that a substantially larger area of the prior board's surface showed the effects of fire damage than in the case of boards made according to the present invention. The flexural strength of the new composition is also markedly improved over that exhibited by the prior board composition.

Upon an inspection of the various boards described in the examples it was found that the thin, flat vermiculite laminae were generally disposed in the board with their flat surfaces transverse to the approximately 1 inch thickness of the board, i.e. the vermiculite particles aligned themselves during de-watering of the slurry in the suction mold such that they flatly oppose transfer of heat transversely through the board. In the normal installation it is of course this transverse heat transfer against which the boards are designed to provide insulation.

The characteristic structure of the boards apparent from inspection is best described in terms of the expanded perlite, vermiculite particles and fibers all being uniformly distributed throughout the composition with the perlite interposed between and thus positioned to hold the vermiculite and fibers apart from one another somewhat. The binder material is also spread throughout the composition and is deposited for the most part on the fibers thereby binding them to the other board components. As noted above, the thin, flat vermiculite particles tend to align themselves with their flat surfaces transverse to the direction of de-watering in the mold, i.e. transverse to the direction of the normal flow of heat when the board is in use. These vermiculite platelets are of course considerably broader, or wider, across their flat surfaces than either the perlite particles or the fibers.

It is of course desirable that the vermiculite ore when initially subjected to exfoliating temperatures be permitted to remain at the controlled temperature for a sufficient length of time to insure removal of substantially all of its water of crystallization so that exfoliation takes place to the maximum extent possible. In this way the likelihood of later latent expansion of the vermiculite platelets while in the final board is reduced.

While I do not wish to be bound by any particular theory as to why the boards disclosed herein possess such superior insulating qualities, it is apparent that the arrangement of the thin, flat vermiculite platelets in the board composition with their flat surfaces transverse to the direction of heat transfer through the board probably accounts in some measure for the unusual results achieved. More specifically, it appears probable that the opaque character of the vermiculite platelets lends very strongly to their insulating value against transfer of radiant heat. It has, for example, been determined that the relative opacity of these vermiculite platelets as compared with expanded perlite particles accounts in some degree for their ready insulation against rather than transmission of radiant heat. Another factor of possibly some importance concerns the relatively high luster or sheen of the flat surfaces of the vermiculite platelets, i.e. radiant heat rays attempting to pass through the boards most likely tend to bounce away from the flat lustrous surfaces and are thereby repelled.

It also appears that the flat vermiculite platelets in the board reduce the permeability of the board, i.e. reduce the ease with which ambient air can move into and between the void spaces in the board, thus improving the board's thermal efficiency. Yet the permeability is not reduced so much as to unduly obstruct the normal water vapor transmission characteristics that the boards must have to be useful in most insulating applications.

One of the main functions of the expanded perlite particles in the boards is to assist in the rate of de-watering of the board forming slurries during board formation. The perlite particles interspersed throughout the fibers tend to maintain the latter somewhat spaced apart so that the fibers are unable to retain or trap a substantial amount of water during the de-watering process. The product may thus be de-watered to a "dry" condition, leaving much less water to be removed upon later drying with heat.

The normal tendency of the delaminated vermiculite platelets in a board forming slurry containing fibers is to drastically retard the rate of de-watering. In fact in a board forming slurry containing only such vermiculite platelets and fibers as the solid materials, de-watering is almost entirely inhibited. Yet when used in the board compositions described and claimed herein, and in the proportions disclosed, the vermiculite platelets are found not to adversely affect the excellent drainage characteristics of the various board forming slurries. This is presumably due to the expanded perlite particles functioning to hold the flat vermiculite platelets apart one from another and thereby to prevent them from effectively masking off the drainage area of the board forming screen or wire.

Other useful ingredients of the finished boards can also be included such as termite repellants, materials which will prevent the formation and growth of algae, sizing materials in cases where the binder component of the boards does not impart to them sufficient resistance to water absorption, etc.

Any of various available board forming machines may be employed for forming the boards described herein, including Fourdrinier machines, rotary vacuum filters or cylinder type board machines, all of which operate continuously, or suction mold type equipment.

Boards made according to the present invention are useful in a variety of common insulating applications. Some illustrative specific uses include roof deck insulation, cold storage insulation, underground perimeter insulation, acoustical tile, and core material for use in conjunction with metal wall partitions, metal fire doors, etc. By appropriate selection of binder and fiber type boards embodying the invention may be used under extreme temperature conditions, including the unusually low temperatures employed in cryogenics experiments as well as temperatures up to 1000° F. and above.

I claim as my invention:

1. A light weight insulating composition consisting essentially of expanded perlite particles comprising 30–65% by weight of the composition, delaminated exfoliated vermiculite particles comprising 15–50% by weight of the composition, fibers comprising 10–25% by weight of the composition, and a binder comprising 10–20% by weight of the composition.

2. The insulating composition as defined in claim 1 in which the delaminated exfoliated vermiculite particles comprise thin, flat platelets and are generally positioned within the composition in parallel relationship one to another.

3. A light weight insulating composition consisting essentially of 30–65% by weight of expanded perlite particles, 15–50% by weight of delaminated exfoliated vermiculite particles, the remainder being fibers and a binder.

4. A light weight insulating composition consisting essentially of expanded perlite particles comprising 30–65% by weight of the composition, delaminated exfoliated vermiculite particles comprising 15–50% by weight of the composition, fibers comprising 10–25% by weight of the composition, and a binder comprising 10–20% by weight of the composition, said binder being selected from the group consisting of asphalt, resin, starch, and sodium silicate.

5. A light weight insulating composition consisting essentially of expanded perlite particles comprising 30–65% by weight of the composition, delaminated exfoliated vermiculite particles comprising 15–50% by weight of the composition, fibers comprising 10–25% by weight of the composition, and a binder comprising 10–20% by weight of the composition, said perlite being present as essentially discrete cellular particles not larger than about 20-mesh particle size, said vermiculite being present as thin, flat platelets, and said expanded perlite, delaminated vermiculite, fibers and binder components each being intimately and uniformly distributed throughout the composition.

References Cited in the file of this patent

UNITED STATES PATENTS

| | | |
|---|---|---|
| 2,036,913 | Brown et al. | Apr. 7, 1936 |
| 2,077,094 | Byers | Apr. 13, 1937 |
| 2,462,255 | Charman et al. | Feb. 22, 1949 |
| 2,626,864 | Miscall et al. | Jan. 27, 1953 |
| 2,634,207 | Miscall et al. | Apr. 7, 1953 |
| 2,634,208 | Miscall et al. | Apr. 7, 1953 |
| 2,884,380 | Cook et al. | Apr. 28, 1959 |